United States Patent [19]
Dick

[11] Patent Number: 5,937,980
[45] Date of Patent: Aug. 17, 1999

[54] BI-DIRECTIONAL ONE-WAY CLUTCH

[75] Inventor: Wesley M. Dick, Fort Wayne, Ind.

[73] Assignee: Dana Corporation, Toledo, Ohio

[21] Appl. No.: 08/805,109

[22] Filed: Feb. 24, 1997

[51] Int. Cl.$^6$ .............................. F16D 11/06; F16D 21/02
[52] U.S. Cl. ........................ 192/43.1; 192/46; 192/48.92; 192/69.1
[58] Field of Search ............................... 192/48.92, 43.1, 192/46, 69.1

[56] References Cited

U.S. PATENT DOCUMENTS

| | | | |
|---|---|---|---|
| 1,508,512 | 9/1924 | Farley . | |
| 2,627,330 | 2/1953 | Gantz | 192/43.1 |
| 2,720,296 | 10/1955 | Briglia | 192/43.1 |
| 3,165,183 | 1/1965 | Clements | 192/48.92 X |
| 3,194,369 | 7/1965 | Witte | 192/45.1 |
| 3,651,907 | 3/1972 | Myers | 192/46 X |
| 4,098,379 | 7/1978 | Fogelburg | 192/38 |
| 4,434,878 | 3/1984 | Okubo | 192/48.92 |
| 4,787,491 | 11/1988 | Kato | 192/48.92 X |
| 5,429,218 | 7/1995 | Itoh et al. | 192/48.92 X |
| 5,449,057 | 9/1995 | Frank | 192/46 |
| 5,597,057 | 1/1997 | Ruth et al. | 192/46 |
| 5,605,211 | 2/1997 | Hall | 192/69.1 X |

*Primary Examiner*—Rodney H. Bonck
*Attorney, Agent, or Firm*—Oldham & Oldham Co., L.P.A.

[57] ABSTRACT

A bi-directional one-way clutch which permits relative overrun or differentiation between a first torque transmitting shaft and a second torque transmitting shaft up to a predetermined level and, if the amount of relative overrun or differentiation between the first torque transmitting shaft and the second torque transmitting shaft this predetermined level, locks the first torque transmitting shaft and the second torque transmitting shaft together such that the first torque transmitting shaft and the second torque transmitting shaft rotate at substantially the same rotational speed. This bi-directional one-way clutch is particularly useful for use in an "on demand" four-wheel drive system having a front wheel drive transaxle assembly where the bi-directional one-way clutch acts an a torque transmitting device which allows relative overrun of differentiation between the front wheels and the rear wheels up to a predetermined level and, if the amount of relative overrun or differentiation between the front wheels and the rear wheels exceeds this predetermined level, locks the front wheels and the rear wheels together such that the front wheels and the rear wheels rotate at substantially the same rotational speed. The bi-directional one-way clutch preferably includes a first torque transmitting shaft which is coupled to the transmission of transaxle assembly such that the first torque transmitting shaft is rotatably driven by the transmission of transaxle assembly and transmits torque to the front axle and a second torque transmitting shaft which is rotatably coupled to the rear axle.

1 Claim, 5 Drawing Sheets

BI-DIRECTIONAL ONE-WAY CLUTCH

BACKGROUND AND SUMMARY OF THE INVENTION

The present invention relates generally to a new and novel bi-directional one-way clutch. More particularly, the present invention relates to a new and novel bi-directional one-way clutch which can be used, for example, as an "on-demand" torque transmitting device in a part-time four-wheel drive motor vehicle to provide a mechanical arrangement for limiting more than a predetermined amount of overrun or differentiation between the front wheels and the rear wheels of the motor vehicle. The bi-directional one-way clutch in accordance with the present invention allows relative overrun or differentiation between the front wheels and the rear wheels of the motor vehicle up to a predetermined threshold and, thereafter, precludes such relative overrun or differentiation so a portion of the torque being provided to the axle with slipping wheels is redirected and transmitted to the axle with non-slipping wheels.

Four-wheel drive motor vehicles are becoming increasingly popular. Recently, certain motor vehicles have been provided with "full-time" four-wheel drive systems. In such "full-time" four-wheel drive systems, the torque transfer cases are typically provided with an interaxle differential for dividing torque between the front wheels and the rear wheels of the motor vehicle. The interaxle differential enables the front wheels and the rear wheels to rotate at different speeds, which occurs during normal turning of the motor vehicle or in the event that the front wheels and the rear wheels have tires with different diameters. However, to prevent excessive relative slipping between the front wheels and the rear wheels, as might occur when one set of wheels encounters a low-traction condition, such as ice, these transfer cases typically include a selectively engageable clutch which is operative to lock the interaxle differential upon sensing a predetermined amount of relative slippage between the front output shaft and the rear output shaft of the transfer case. Locking of the interaxle differential prevents any further relative overrun or differentiation between the front output shaft and the rear output shaft of the transfer case.

Known prior "full-time" four-wheel drive systems have generally required complex electronic sensors or other complex systems to monitor the overrun or differentiation between the front output shaft and the rear output shaft or the front wheels and the rear wheels of a motor vehicle. Upon sensing relative overrun or differentiation, an electronic control system determines whether the relative overrun or differentiation being encountered is within a "normal" expected range or is "excessive." If the electronic control system indicates that the overrun or differentiation being experienced is "excessive," the electronic control system causes the selectively engageable clutch to lock the interaxle differential to preclude any further relative overrun or differentiation. An electronic control system of this type can be expensive to manufacture and maintain and a more cost-effective, simplified "on demand" system of limiting more than a predetermined amount of overrun or differentiation between the front wheels and the rear wheels of the motor vehicle would be desirable.

A preferred embodiment of the present invention is, therefore, directed to a bi-directional one-way clutch which permits relative overrun or differentiation between a front torque transmitting shaft and a rear torque transmitting shaft up to a predetermined level and, if the amount of relative overrun or differentiation between the front torque transmitting shaft and the rear torque transmitting shaft exceeds this predetermined level, locks the front torque transmitting shaft and the rear torque transmitting shaft together such that the front torque transmitting shaft and the rear torque transmitting shaft rotate at the same rotational speed. This bi-directional one-way clutch is particularly useful for use in an "on demand" four-wheel drive system for a motor vehicle having an engine and a front wheel drive transaxle assembly where the bi-directional one-way clutch acts as a torque transmitting device which allows relative overrun or differentiation between the front wheels and the rear wheels of the motor vehicle up to a predetermined level and, if the amount of relative overrun or differentiation between the front wheels and the rear wheels of the motor vehicle exceeds this predetermined level, locks the front wheels and the rear wheels of the motor vehicle together such that the front wheels and the rear wheels of the motor vehicle rotate at the same rotational speed. The bi-directional one-way clutch preferably includes an first torque transmitting shaft coupled to the transmission or transaxle assembly such that the first torque transmitting shaft is rotatably driven by the transmission or transaxle assembly and transmits torque to the front axle of the motor vehicle and a second torque transmitting shaft which is rotatably coupled to the rear axle of the motor vehicle. If the rotational speed of the front wheels overrides the rotational speed of the rear wheels by less than a predetermined amount, say 20%, bi-directional one-way clutch does not engage and relative overrun or differentiation between the front wheels and the rears wheels is permitted. However, if the rotational speed of the front wheels overrides the rotational speed of the rear wheels by more that the predetermined amount, for example, when the front wheels of the motor vehicle are on ice, snow, mud or some other slippery surface, bi-directional one-way clutch locks the front wheels and the rear wheels of the motor vehicle together to transmit a portion of the torque being provided to the excessively overrunning or differentiating front wheels to the rear wheels and cause the front wheels and the rear wheels to rotate together at substantially the same rotational speed.

Accordingly, the present invention provides a simple, all-mechanical arrangement for permitting a first torque transmitting shaft to overrun or differentiate up to a predetermined amount in relation to a second torque transmitting shaft, but when the first torque transmitting shaft overruns or differentiates greater than this predetermined amount in relation to the second torque transmitting shaft, the bi-directional one-way clutch locks the first torque transmitting shaft and the second torque transmitting shaft together to rotate at substantially the same rotational speed.

Other advantages and novel features of the present invention will become apparent in the following detailed description of the invention when considered in conjunction with the accompanying drawings.

DETAILED DESCRIPTION OF THE DRAWINGS

Figure 1:
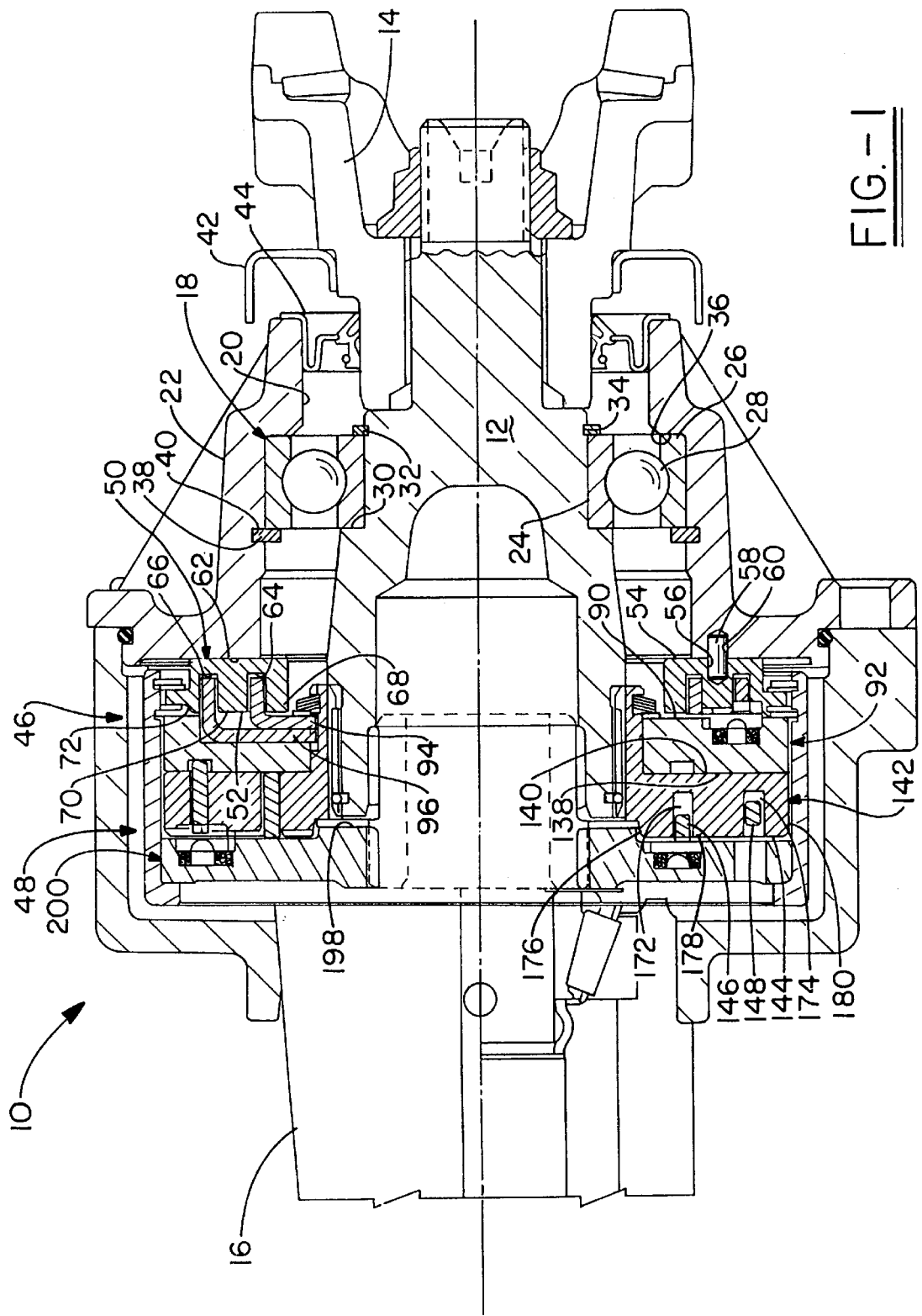
FIG. 1 is an elevational view, in cross-section of a bi-directional one-way clutch in accordance with a preferred embodiment of the present invention.

In the following detailed description of a preferred embodiment of the present invention, reference is made to the accompanying drawings which, in conjunction with this detailed description, illustrate and describe a preferred embodiment of a bi-directional one-way clutch, generally identified by reference number 10, in accordance with the present invention. Referring now to the drawings, in which like-referenced characters indicate corresponding elements throughout the several views, attention is first directed to FIG. 1, which is an elevational view, in cross-section, bi-directional one-way clutch 10 in accordance with a preferred embodiment of the present invention. Bi-directional one-way clutch 10 is preferably coupled with motor vehicle transaxle or transmission assembly (not shown) of conventional design which, in turn, is coupled to motor vehicle drive engine (not shown), also preferably of conventional design. Bi-directional one-way clutch 10 generally includes first or front torque transmitting shaft 12, which is preferably connected to the rearward end of a motor vehicle front axle drive shaft (not shown) via universal joint coupling 14 of conventional design. Forward end (not shown) of motor vehicle front axle drive shaft (not shown) is coupled to input shaft or yoke (not shown) of motor vehicle front differential unit (not shown) via universal joint coupling (not shown) of conventional design. Motor vehicle front differential unit (not shown) is adapted to divide torque from motor vehicle front axle drive shaft (not shown) to front wheels (not shown) of the motor vehicle. Bi-directional one-way clutch 10 also includes second or rear torque transmitting shaft 16 which is drivingly connected to forward end (not shown) of motor vehicle rear axle drive shaft (not shown) of conventional design. Motor vehicle rear axle drive shaft (not shown) has a rearward end (not shown) connected to an input shaft or yoke (not shown) of motor vehicle rear differential unit (not shown) via universal joint coupling (not shown) of conventional design. Motor vehicle rear differential unit (not shown) is adapted to divide torque received from motor vehicle rear axle drive shaft (not shown) between rear wheels (not shown) of the motor vehicle.

First or front torque transmitting shaft 12 is rotatably supporting by bearing assembly 18, most preferably a ball bearing assembly, within central opening 20 in non-rotatable housing 22. Bearing assembly 18 generally includes inner race 24, outer race 26 and a plurality of ball bearings 28 which are retained in position by a bearing cage (not shown). Inner race 24 is restrained from rearward movement by outwardly extending flange portion 30 of first or front torque transmitting shaft 12 and from forward movement by snap ring 32 which is removably positioned in groove 34 in first or front torque transmitting shaft 12. Outer race 26 is restrained from forward movement by inwardly extending flange 36 in central opening 20 of non-rotatable housing 22 and from rearward movement by snap ring 38 removably positioned in groove 40 in non-rotatable housing 22. Radially extending protective collar 42 is provided at the forward end of bi-directional one-way clutch 10 to shield bi-directional one-way clutch 10 from dirt and other debris and seal gasket 44 retains lubrication for bearing assembly 18 and also precludes outside dirt and debris from interfering with the operation of bearing assembly 18.

Figure 2:
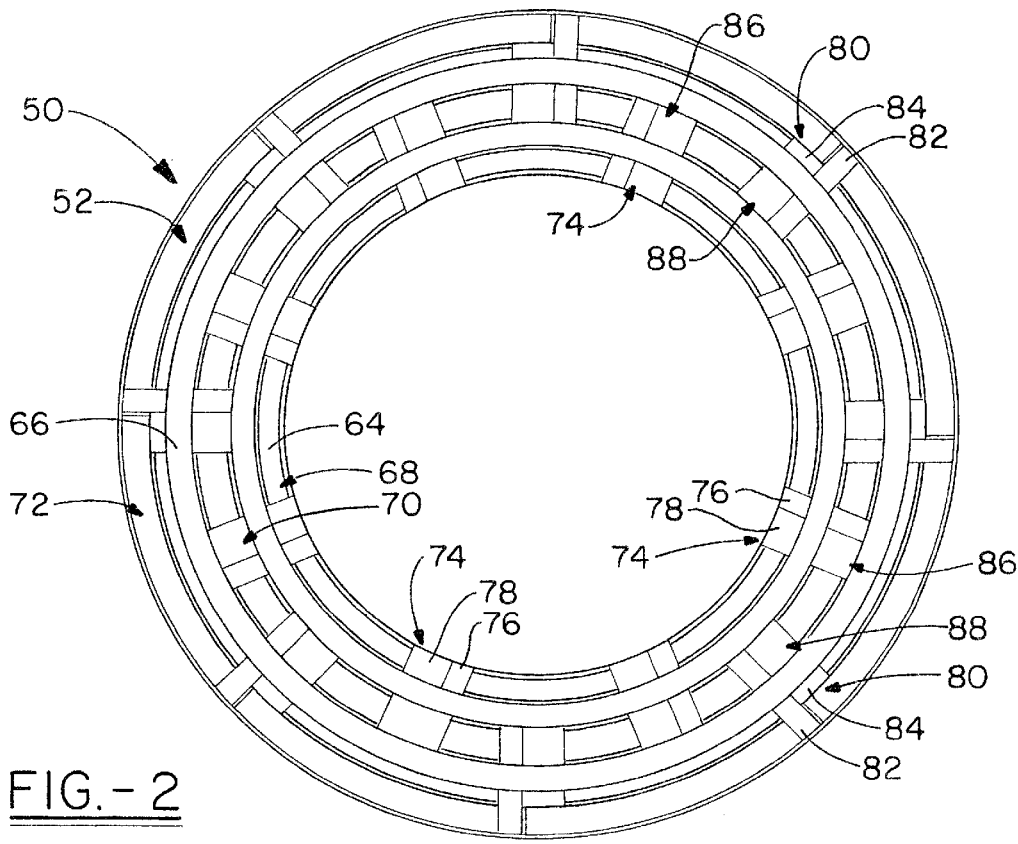
FIG. 2 is a plan view of the rearward surface of a reverser clutch notch plate for the bi-directional one-way clutch in accordance with the preferred embodiment of the present invention shown in FIG. 1.

Bi-directional one-way clutch 10 generally includes reverser clutch portion 46 which is always engaged in one of two (2) positions, forward or reverse, and main clutch portion 48, which engages only when first or front torque transmitting shaft 12 overruns second or rear torque transmitting shaft 16 by more than a predetermined amount, such as, for example, 20%. Referring now to FIG. 2, reverser clutch portion 46 includes reverser clutch notch plate 50, a top view of rearward surface 52 of which is shown in FIG. 2. Forward surface 54 of reverser clutch notch plate 50 preferably includes a number of openings 56 into which pins 58 extending from openings 60 in rearward surface 62 of non-rotatable housing 22 are positioned to mount reverser clutch notch plate 50 to non-rotatable housing 22. Rearward surface 52 of reverser clutch notch plate 50 includes inner groove 64 and outer groove 66 which divides rearward surface 52 of reverser clutch notch plate 50 into inner rearwardly extending portion 68, central rearwardly extending portion 70 and outer rearwardly extending portion 72. Inner rearwardly extending portion 68 includes eight (8) uni-directional cam elements 74 equally spaced around the circumference of inner rearwardly extending portion 68. Uni-directional cam elements 74 each include flat portion 76 and inclined surface 78 extending in a first circumferential direction from flat portion 76. Similarly, outer rearwardly extending portion 72 includes eight (8) uni-directional cam elements 80 equally spaced around the circumference of outer rearwardly extending portion 72. Unidirectional cam elements 80 each include flat portion 82 and inclined surface 84 extending from flat portion 82 in a second circumferential direction opposite to that of first circumferential direction. Central rearwardly extending portion 70 preferably includes a first set of eight (8) uni-directional cam elements 86 which correspond to uni-directional cam elements 74 in location and configuration and a second set of eight (8) uni-directional cam elements 88 which correspond to uni-directional cam elements 80 in location and configuration.

Figure 3:
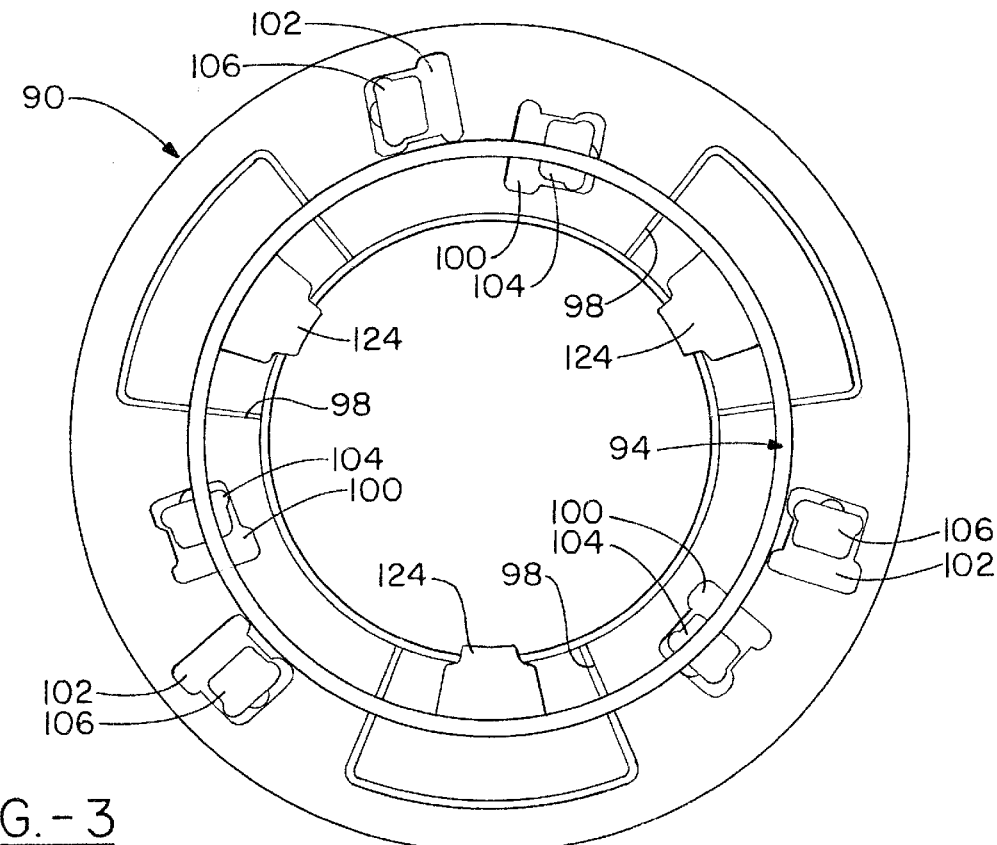
FIG. 3 is a plan view of the forward surface of a combination reverser clutch pocket and main clutch cam plate for the bi-directional one-way clutch in accordance with the preferred embodiment of the present invention shown in FIG. 1.

Referring now to FIG. 3, which shows a plan view of forward surface 90 of combination reverser clutch pocket and main clutch cam plate 92 for bi-directional one-way clutch 10 and corresponding inner cam ring 94 and outer cam ring 96 for bi-directional one-way clutch 10, forward surface 90 of combination reverser clutch pocket and main clutch cam plate 92 generally includes three (3) circumferentially extending positioning pockets 98 equally spaced around the circumference of combination reverser clutch pocket and main clutch cam plate 92. In addition, forward surface 90 of combination reverser clutch pocket and main clutch cam plate 92 includes three (3) inner pivotal member pockets 100 extending in a first circumferential direction and three (3) outer pivotal member pockets 102 extending in a second circumferential direction opposite to first circumferential direction. As seen in FIG. 3, pivotal members 104 are positioned in inner pivotal member pockets 100 and outer pivotal member pockets 102 overlying spring members 106 which normally bias pivotal members 104 upwardly from forward surface 90 of combination reverser clutch pocket and main clutch cam plate 92.

Figure 4A:
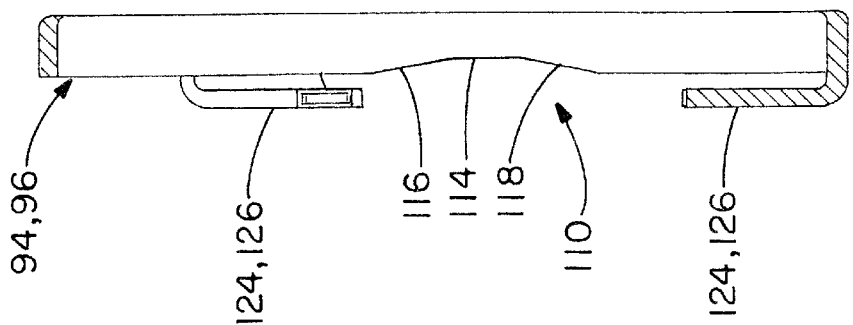
FIG. 4A is a sectional view of the cam ring shown in FIG. 4 as taken on line 4A—4A thereof.
Figure 4:
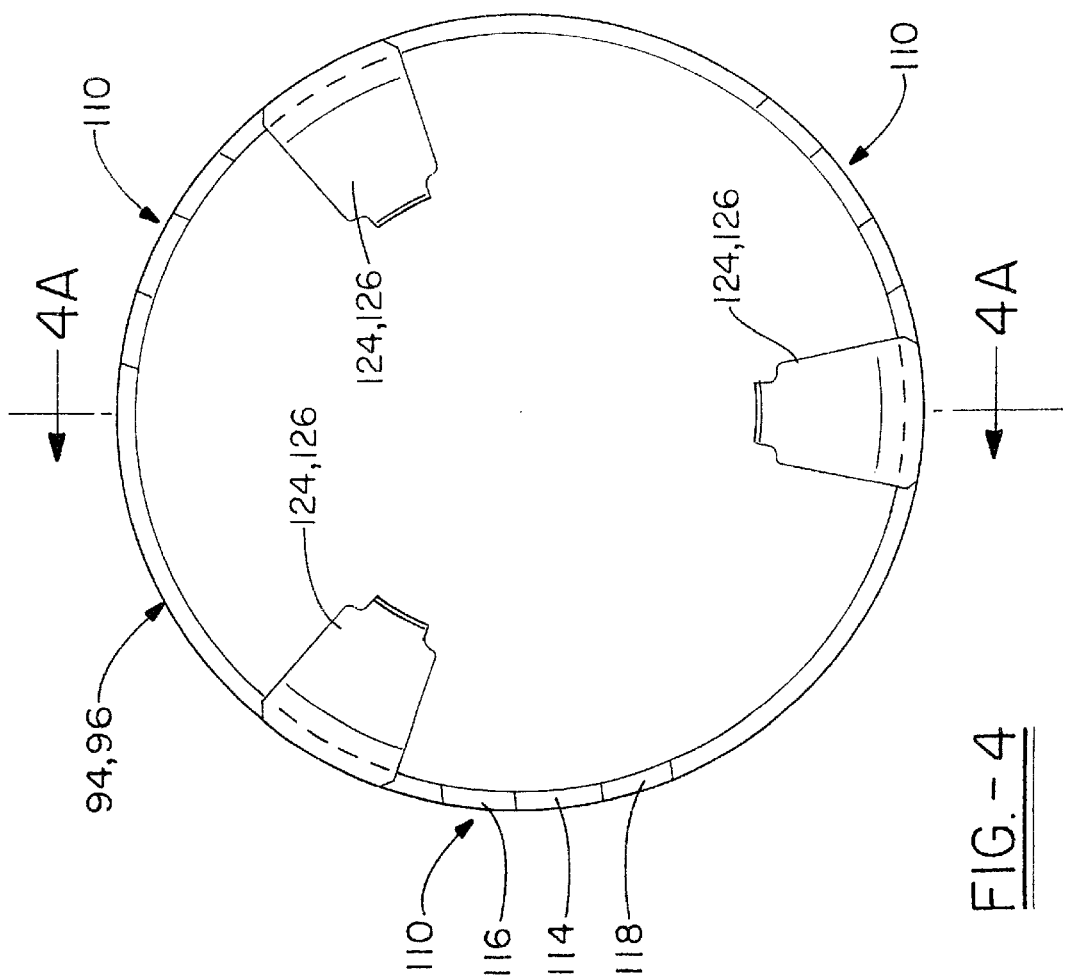
FIG. 4 is a plan view of a cam ring for the bi-directional one-way clutch in accordance with the preferred embodiment of the present invention shown in FIG. 1.

As best seen in FIGS. 4 and 4A, inner cam ring 94 and outer cam ring 96 each include cam portions 108 and 110, respectively, which overlie inner pivotal member pockets 100 and outer pivotal member pockets 102. Cam portions 108 and 110 each include flat portions 112 and 114, respectively, and inclined surfaces 116 and 118, respectively, extending from flat portions 112 and 114 in a first circumferential direction and inclined surfaces 120 and 122, respectively, extending from flat portions 112 and 114 in a second circumferential direction opposite to first circumferential direction. Inner cam ring 94 and outer cam ring 96 also each include three (3) inwardly extending positioning members 124 and 126, respectively, which are retained in circumferentially extending positioning pockets 98 and are dimensioned to be able to slide circumferentially within circumferentially extending positioning pockets 98. The relationship between inwardly extending positioning members 124 and 126 and cam portions 108 and 110 are such that, at any point in time, three (3) pivotal members 104 in either inner pivotal member pockets 100 or outer pivotal member pockets 102 are depressed by inner cam ring 94 or outer cam ring 96, while the other three (3) pivotal members 104 in the other of inner pivotal member pockets 100 or outer pivotal member pockets 104 are aligned with flat portions 112 or 114 and, therefor, are biased upwardly from forward surface 90 of combination reverser clutch pocket and main clutch cam plate 92 by spring members 106. Alignment between inner cam ring 94 and outer cam ring 96 is preferably maintained by inwardly projecting portions 128 and 130, respectively, which engage in grooves 132 on outside surface 134 of splined cylindrical member 136.

Figure 5:
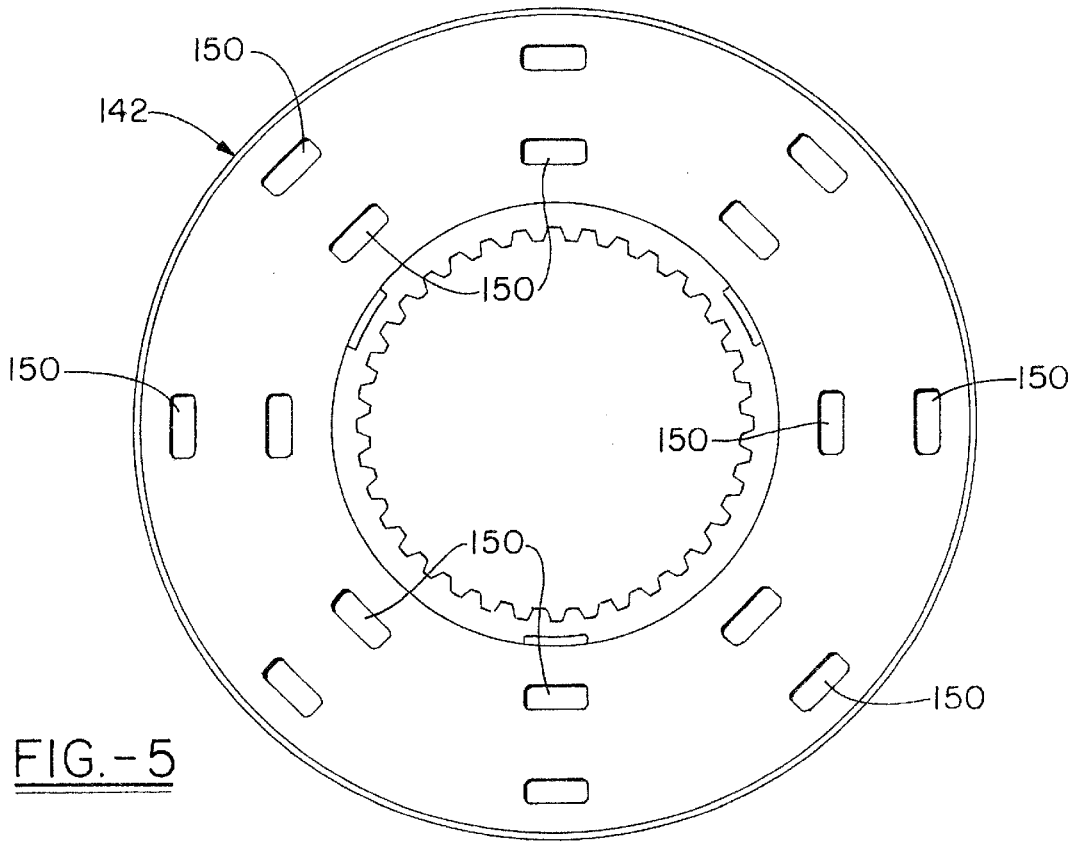
FIG. 5 is a plan view of the forward surface of a main clutch notch plate for the bi-directional one-way clutch in accordance with the preferred embodiment of the present invention shown in FIG. 1.
Figure 6:
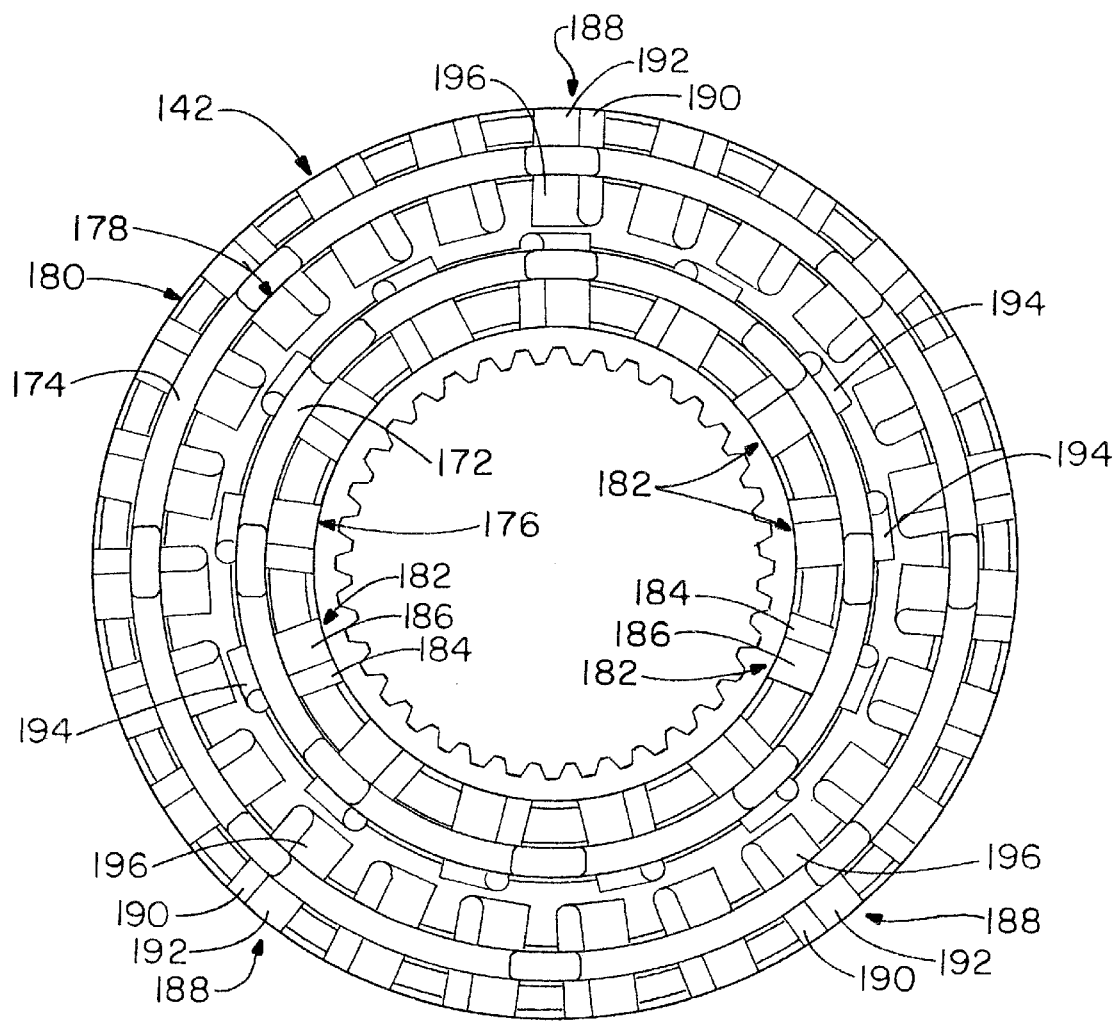
FIG. 6 is a plan view of the rearward surface of the main clutch notch plate for the bi-directional one-way clutch in accordance with the preferred embodiment of the present invention shown in FIG. 1.

Referring now to FIG. 5, which shows a plan view of main clutch notch plate 142, and FIG. 6, which shows a plan view of rearward surface 144 of main clutch notch plate 142, forward surface 140 of main clutch notch plate 142 preferably includes a number of openings 150 into which upwardly extending portions 152 and 154, respectively, of inner cam ring 146 and outer cam ring 148 are positioned such that upwardly extending portions 152 and 154 are capable of sliding relative to main clutch notch plate 142. Rearward surface 138 of combination reverser clutch pocket and main clutch cam plate 92 includes eight (8) inner cam portions 156 corresponding to upwardly extending portions 152 and eight (8) outer cam portions 158 corresponding to upwardly extending portions 154. Inner cam portions 156 and outer cam portions 158 each include flat portions 160 and 162, respectively, and inclined surfaces 164 and 166 extending from flat portions 160 and 162 in a first circumferential direction and inclined surfaces 168 and 170 extending from flat portions 160 and 162 in a second circumferential direction opposite to first circumferential direction.

Referring now to FIG. 6, rearward surface 144 of main clutch notch plate 142 generally includes inner groove 172 and outer groove 174 which divides rearward surface 144 of main clutch notch plate 142 into inner rearwardly extending portion 176, central rearwardly extending portion 178 and outer rearwardly extending portion 180. Inner rearwardly extending portion 176 includes sixteen (16) uni-directional cam elements 182 equally spaced around the circumference of inner rearwardly extending portion 176. Uni-directional cam elements 182 each include flat portion 184 and inclined surface 186 extending in a first circumferential direction from flat portion 184. Similarly, outer rearwardly extending portion 180 includes sixteen (16) uni-directional cam elements 188 equally spaced around the circumference of outer rearwardly extending portion 180. Uni-directional cam elements 188 each include flat portion 190 and inclined surface 192 extending from flat portion 190 in a second circumferential direction opposite to that of first circumferential direction. Central rearwardly extending portion 178 preferably includes a first set of sixteen (16) uni-directional cam elements 194 which correspond to unidirectional cam elements 182 in location and configuration and a second set of sixteen (16) uni-directional cam elements 196 which correspond to uni-directional cam elements 188 in location and configuration.

Figure 7:
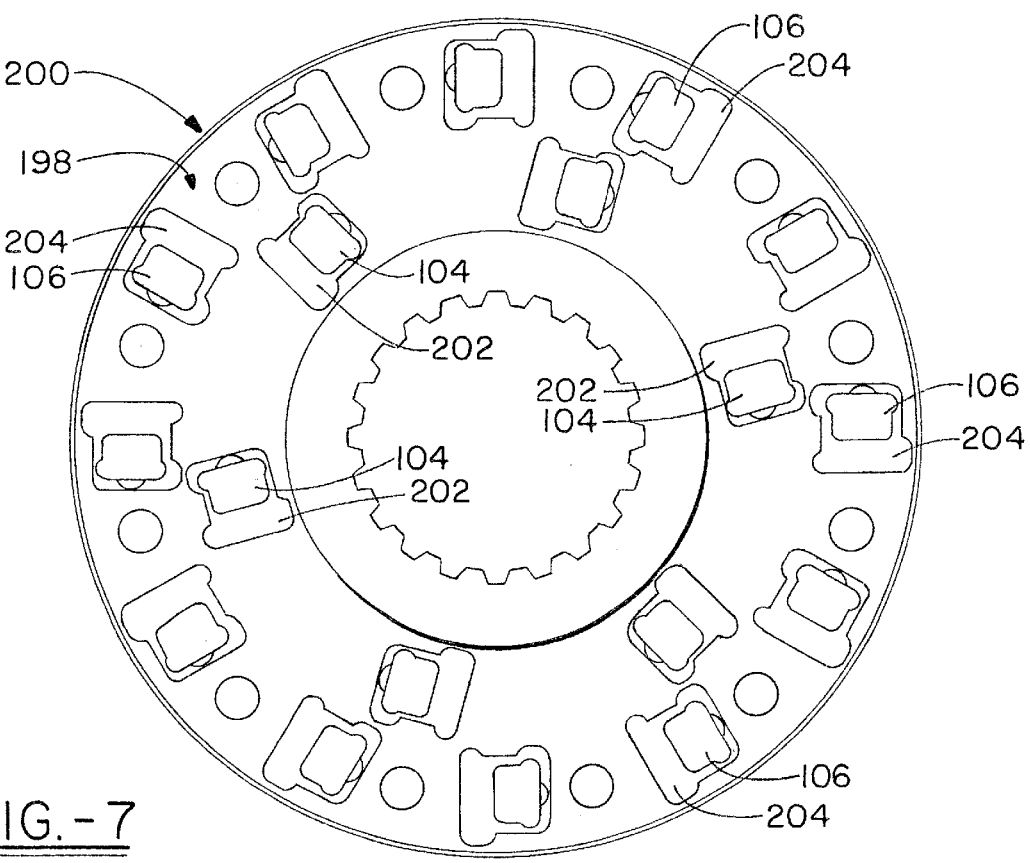
FIG. 7 is a plan view of the forward surface of the main clutch pocket plate having a spring member positioned in one of the inner pivotal member pockets and a spring member and a pivotal member positioned in one of the outer pivotal member pockets for the bi-directional one-way clutch in accordance with the preferred embodiment of the present invention shown in FIG. 1.

Referring now to FIG. 7, which shows a plan view of forward surface 198 of main clutch pocket plate 200, forward surface 198 of main clutch pocket plate 200 generally includes six (6) inner pivotal member pockets 202 extending in a first circumferential direction and twelve (12) outer pivotal member pockets 204 extending in a second circumferential direction opposite to first circumferential direction. Pivotal members 104 are positioned in inner pivotal member pockets 202 and outer pivotal member pockets 204 overlying spring members 106 which normally bias pivotal members 104 upwardly from forward surface 198 of main clutch pocket plate 200.

As seen in FIG. 6, inner cam ring 146 and outer cam ring 148 overlie inner pivotal member pockets 202 and outer pivotal member pockets 204, respectively. Inner cam portions 156 and outer cam portions 158 are positioned such that when upwardly extending portions 152 of inner cam ring 146 are positioned in flat portions 160 of inner cam portions 156, upwardly extending portions 154 of outer cam ring 148 are positioned against rearward surface 138 of combination reverser clutch pocket and main clutch cam plate 92. Thus, when in this position, the twelve (12) pivotal members 104 in outer pivotal member pockets 204 are depressed by outer cam ring 148 and the six (6) pivotal members 104 in inner pivotal member pockets 202 are biased upwardly from forward surface 198 of main clutch pocket plate 200 by spring members 106.

On the other hand, when upwardly extending portions 154 of outer cam ring 148 are positioned in flat portions 162 of outer cam portions 158, upwardly extending portions 152 of inner cam ring 146 are positioned against rearward surface 138 of combination reverser clutch pocket and main clutch cam plate 92. Thus, when in this position, the six (6) pivotal members 104 in inner pivotal member pockets 202 are depressed by inner cam ring 146 and the twelve (12) pivotal members 104 in outer pivotal member pockets 204 are biased upwardly from forward surface 198 of main clutch pocket plate 200 by spring members 106.

In operation, bi-directional one-way clutch 10 provides a dual acting one-way clutch by reverser clutch portion 46 sensing the rotational direction of first or front torque transmitting shaft 12, the rotational direction being either forward or reverse, and main clutch portion 48 then sets the one-way clutching device to respond to that direction such that torque will be transmitted to second or rear torque transmitting shaft 16 any time the rotational speed of second or rear torque transmitting shaft 16 is less that a predetermined amount of overrun or differentiation below the rotational speed of first or front torque transmitting shaft 12, such as when first or front torque transmitting shaft 12 is spinning on ice, mud, snow or some other slippery surface. Thus, when first or front torque transmitting shaft 12 is rotated in one direction relative to non-rotatable housing 22, inner cam ring 94 and outer cam ring 96 rotate within circumferentially extending positioning pockets 98 to position reverser portion clutch portion 46 in either forward or reverse depending upon the direction of rotation of first or front torque transmitting shaft 12. At this time, main clutch portion 48 engages when second or rear torque transmitting shaft 16 overruns or differentiates relative to first or front torque transmitting shaft 12 greater than a predetermined amount, for example 20%, thus locking first or front torque transmitting shaft 12 and second or rear torque transmitting shaft 16 together so they rotate at substantially the same rotational speed.

Although the present invention has been described above in detail, the same is by way of illustration and example only and is not to be taken as a limitation on the present invention. For example, the number and arrangement of pivotal members 104 could be readily changed to fabricate a suitable bidirectional one-way clutch using the teachings of the present invention. Accordingly, the scope and content of the present invention are to be defined only by the terms of the appended claims.

What is claimed is:

1. A bi-directional one-way clutch, comprising:

a first torque transmitting shaft coupled to a source of rotational energy, said first torque transmitting adapted to be rotated in a first rotational direction and a second rotational direction opposite to the first rotational direction;

a second torque transmitting shaft coupled to a second source of rotational energy, said second torque transmitting shaft is adapted to rotate in the same rotational direction as said first torque transmitting shaft;

a bi-directional one-way clutch positioned intermediate said first torque transmitting shaft and said second torque transmitting shaft, said bi-directional one-way clutch including a reverser clutch portion adapted to sense the rotational direction of said first torque transmitting shaft, said reverser clutch portion including a first set of clutch elements which are actuated when said first torque transmitting shaft rotates in the first rotational direction and which are disabled when said first torque transmitting shaft rotates in the second rotational direction and a second set of clutch elements which are actuated when said first torque transmitting shaft rotates in the first rotational direction; and said bi-directional one-way clutch further including a main clutch portion having a first set of clutch elements which are actuated in a direction substantially parallel to the longitudinal axis of said first torque transmitting shaft and said second torque transmitting shaft to rotationally lock said first torque transmitting shaft and said second torque transmitting shaft when said first torque transmitting shaft is rotating in the first rotational direction and said first torque transmitting shaft overruns said second torque transmitting shaft by more than a predetermined amount and which are disabled when said first torque transmitting shaft is rotating in the second rotational direction and a second set of clutch elements which are actuated in a direction substantially parallel to the longitudinal axis of said first torque transmitting shaft and said second torque transmitting shaft to rotationally lock said first torque transmitting shaft and said second torque transmitting shaft when said first torque transmitting shaft is rotating in the second rotational direction and when said first torque transmitting shaft overruns said second torque transmitting shaft by greater than a predetermined amount and which are disabled when said first torque transmitting shaft is rotating in the first rotational direction.

\* \* \* \* \*